United States Patent
Kayode et al.

(10) Patent No.: US 11,536,874 B2
(45) Date of Patent: Dec. 27, 2022

(54) NUMERICAL SIMULATION OF HYDROCARBON SYSTEMS WITH VISCOSITY GRADIENT

(71) Applicant: Saudi Arabian Oil Company, Dhahran (SA)

(72) Inventors: Babatope Kayode, Dhahran (SA); Gabor Hursan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 117 days.

(21) Appl. No.: 16/697,651

(22) Filed: Nov. 27, 2019

(65) Prior Publication Data

US 2021/0157028 A1 May 27, 2021

(51) Int. Cl.
*G01V 99/00* (2009.01)
*G06F 30/20* (2020.01)
(Continued)

(52) U.S. Cl.
CPC ............ *G01V 99/005* (2013.01); *E21B 47/00* (2013.01); *G01V 3/32* (2013.01); *G01V 3/38* (2013.01);
(Continued)

(58) Field of Classification Search
CPC .......... G01V 99/005; G01V 3/32; G01V 3/38; E21B 47/00; E21B 2200/20; G06F 30/20; G06F 2111/10; Y02A 90/30
(Continued)

(56) References Cited

U.S. PATENT DOCUMENTS 6,321,840 B1   11/2001   Billiter et al.
8,235,110 B2   8/2012    Larter et al.
(Continued)

FOREIGN PATENT DOCUMENTS

EP   2848964   3/2015
EP   3032026   6/2016
(Continued)

OTHER PUBLICATIONS

Murphy, Eric, et al. "Integration of NMR and Wireline Formation Tester Data for Robust Formation Evaluation and Hydrocarbon Properties Determination." SPWLA 47th Annual Logging Symposium. Society of Petrophysicists and Well-Log Analysts, 2006. pp. 1-12. (Year: 2006).*

(Continued)

*Primary Examiner* — John E Johansen
(74) *Attorney, Agent, or Firm* — Fish & Richardson P.C.

(57) ABSTRACT

Methods for simulation of hydrocarbon systems having a sharply varying viscosity gradient include receiving, by a computer system, Neutron Magnetic Resonance (NMR) logs for hydrocarbon wells in an oilfield. The computer system identifies viscosity regions of hydrocarbons present within the hydrocarbon wells based on the NMR logs. The computer system determines equation of state (EOS) parameters based on compositional analysis of pressure-volume-temperature (PVT) samples obtained from the hydrocarbon wells. The computer system generates a three-dimensional (3D) model of the oilfield, using as inputs, the viscosity regions, the EOS parameters, and a fluid composition gradient with respect to a depth within each viscosity region. The computer system determines a landing depth from the surface of the Earth for operation of peripheral water injectors based on simulating the 3D viscosity model.

20 Claims, 10 Drawing Sheets

(51) Int. Cl.
G01V 3/32 (2006.01)
G01V 3/38 (2006.01)
E21B 47/00 (2012.01)
G06F 111/10 (2020.01)

(52) U.S. Cl.
CPC .......... *G06F 30/20* (2020.01); *E21B 2200/20* (2020.05); *G06F 2111/10* (2020.01); *Y02A 90/30* (2018.01)

(58) Field of Classification Search
USPC .......................................................... 703/10
See application file for complete search history.

(56) References Cited

U.S. PATENT DOCUMENTS

| | | | | |
|---|---|---|---|---|
| 9,022,140 B2* | 5/2015 | Marx | ...................... | G06N 7/005 175/50 |
| 2008/0204013 A1* | 8/2008 | Badry | ................... | G01N 24/081 324/303 |
| 2012/0232859 A1* | 9/2012 | Pomerantz | ............. | G01V 1/282 703/2 |
| 2017/0247992 A1 | 8/2017 | Parrella et al. | | |

FOREIGN PATENT DOCUMENTS

| | | | |
|---|---|---|---|
| WO | WO 2009142840 | 11/2009 | |
| WO | WO 2013066953 | 5/2013 | |
| WO | WO-2013066953 A2 * | 5/2013 | ............. G01V 11/00 |

OTHER PUBLICATIONS

Fleury, M., et al. "Comparison of NMR laboratory and log measurements in a bitumen sand." Proceedings of the International Symposium of the Society of Core Analysts, Sep. 22-25, 2002, Monterey, USA. 2002. pp. 2-12. (Year: 2002).*
Akkurt, Ridvan, et al. "From molecular weight and NMR relaxation to viscosity: An innovative approach for heavy oil viscosity estimation for real-time applications." Petrophysics—The SPWLA Journal of Formation Evaluation and Reservoir Description 51.02 (2010). pp. 89-101. (Year: 2010).*
PCT International Search Report and Written Opinion issued in International Application No. PCT/US2020/061981 dated Mar. 15, 2021, 17 pages.
Al-Harthi et al, "Tar Characterization for Optimum Reservoir Management Strategy," SPE 160891, SPE Saudi Arabia Section Technical Symposium and Exhibition, Apr. 2012, Al-Khobar, Saudi Arabia, 9 pages.
Hirschberg, "Role of Asphaltenes in Compositional Drading of a Reservoir's Fluid Column," SPE 13171-PA, Journal of Petroleum Technology, vol. 40, issue 1, Jan. 1988, 6 pages.
Hursan et al, "Oil viscosity estimation from NMR logs for In-situ heavy oil characterization," SPE-181600-MS, SPE Annual Technical Conference and Exhibition, Dubai, Sep. 2016, 13 pages.
Jedaan et al, "Characterization, Origin and Repartition of Tar Mat in the Bul Hanine Field in Qatar," International Petroleum Technology Conference, Dec. 2007, Dubai, U.A.E., 12 pages.
Kalehbasti et al, "Fluid Characterization, A case study of a field with Compositional Gradient," SPE-141522-MS, SPE Middle East Oil and Gas Show and Conference, Sep. 2011, Manama, Bahrain, 10 pages.
Montel et al, "Pressure and compositional gradients in reservoirs," SPE-85668-MS, Nigeria Annual International Conference and Exhibition, Aug. 2003, Abuja, Nigeria,8 pages.
Mullins et al, "Diverse Fluid Gradients Associated with Biodegradation of Crude Oil," SPWLA 60th Annual Logging Symposium, Woodlands; Texas, Jun. 2019, 10 pages.

* cited by examiner

```
┌─────────────────────────────────────────────────────────────────┐
│ Receive, by a computer system, multiple nuclear magnetic        │
│ resonance (NMR) logs for multiple hydrocarbon wells in an oilfield │
│                              904                                 │
└─────────────────────────────────────────────────────────────────┘
                                 │
                                 ▼
┌─────────────────────────────────────────────────────────────────┐
│ Identify, by the computer system, multiple viscosity regions of │
│ hydrocarbons present within the hydrocarbon wells based on the  │
│ NMR logs                                                         │
│                              908                                 │
└─────────────────────────────────────────────────────────────────┘
                                 │
                                 ▼
┌─────────────────────────────────────────────────────────────────┐
│ Determine, by the computer system, equation of state (EOS)      │
│ parameters based on compositional analysis of pressure-volume-  │
│ temperature (PVT) samples obtained from the hydrocarbon wells   │
│                              912                                 │
└─────────────────────────────────────────────────────────────────┘
                                 │
                                 ▼
┌─────────────────────────────────────────────────────────────────┐
│ Generate, by the computer system, a three-dimensional (3D) model│
│ of oil viscosity across the oilfield, the generating of the 3D  │
│ viscosity model based on the EOS parameters, NMR-predicted      │
│ viscosity regions, and a composition-depth equation within each │
│ viscosity region                                                 │
│                              916                                 │
└─────────────────────────────────────────────────────────────────┘
                                 │
                                 ▼
┌─────────────────────────────────────────────────────────────────┐
│ Simulate, by the computer system, the model of the viscosity    │
│ regions to determine a landing depth from the surface of the    │
│ Earth for operation of peripheral water injectors               │
│                              920                                 │
└─────────────────────────────────────────────────────────────────┘
```

FIG. 9

NUMERICAL SIMULATION OF HYDROCARBON SYSTEMS WITH VISCOSITY GRADIENT

TECHNICAL FIELD

This description relates generally to hydrocarbon wells, for example, to numerical simulation of hydrocarbon systems having a sharply varying viscosity gradient.

BACKGROUND

Hydrocarbon recovery from oil wells poses increasing challenges as a result of the transitions in viscosity of the hydrocarbons. High viscosity oil (tar) is impermeable to water. Hence if water injectors are landed below the tar, there may be no pressure support within the light hydrocarbon region. Similarly, if the water injectors are landed too shallow in the light hydrocarbon column, then hydrocarbon recovery can be negatively impacted. Determining oil viscosity can therefore be important before landing each injector lateral. Traditional methods based on the use of a constant, flat depth for defining viscosity regions across an oil field can lead to sub-optimal results in areas of the oil field where the actual viscosity transitions are deeper or shallower than the constant, flat depth assumed.

SUMMARY

Methods for simulation of hydrocarbon systems having a sharply varying viscosity gradient include receiving, by a computer system, Neutron Magnetic Resonance (NMR) logs for hydrocarbon wells in an oilfield. The computer system identifies viscosity regions of hydrocarbons present within the hydrocarbon wells based on the NMR logs. The computer system determines equation of state (EOS) parameters based on compositional analysis of pressure-volume-temperature (PVT) samples obtained from the hydrocarbon wells. The computer system generates a three-dimensional (3D) model of oil viscosity across the oilfield based on the EOS parameters, the viscosity regions, and a fluid composition gradient with respect to a depth within each viscosity region. The computer system determines a landing depth from the surface of the Earth for operation of peripheral water injectors based on simulating the 3D viscosity model.

BRIEF DESCRIPTION OF THE DRAWINGS

FIG. 9 illustrates a process for numerical simulation of hydrocarbon systems with a sharp viscosity gradient.

DETAILED DESCRIPTION

The implementations disclosed provide methods, apparatus, and systems for numerical simulation of hydrocarbon systems with viscosity gradient. The implementations enable the development of hydrocarbon extraction using peripheral water injection in wells exhibiting a depth-dependent oil viscosity trend. The implementations further enable determination of an efficient landing depth for water injector laterals to ensure adequate injectivity (the injectors are not landed in oil that is too viscous to be injected through) and improve hydrocarbon recovery (injectors are not injected above movable oil). The implementations can be employed for mapping viscosity regions across an oilfield and for numerical modeling of depth-dependent viscosity.

Among other benefits and advantages, the methods provide a flexible and integrated framework for numerical simulation of hydrocarbon systems with viscosity gradient. The implementations disclosed provide efficient landing depths of water injectors. The implementations enable oilfield development by enabling optimal placement of water injectors to ensure adequate injectivity while ensuring that injectors are not placed above recoverable hydrocarbons. Neutron Magnetic Resonance (NMR) logs are exploited to obtain viscosity predictions for defining viscosity regions in an oilfield. The viscosity regions are selected at the well level; each viscosity region is correlated from well-to-well across the oilfield. Thus, the viscosity region depths are not constant values, improving the mapping of the oilfield. The implementation provide a viable model of fluid viscosity iso-surfaces. The drilling can thus be designed using the constructed model, thereby eliminating the high cost of geo-steering every well.

Figure 1:
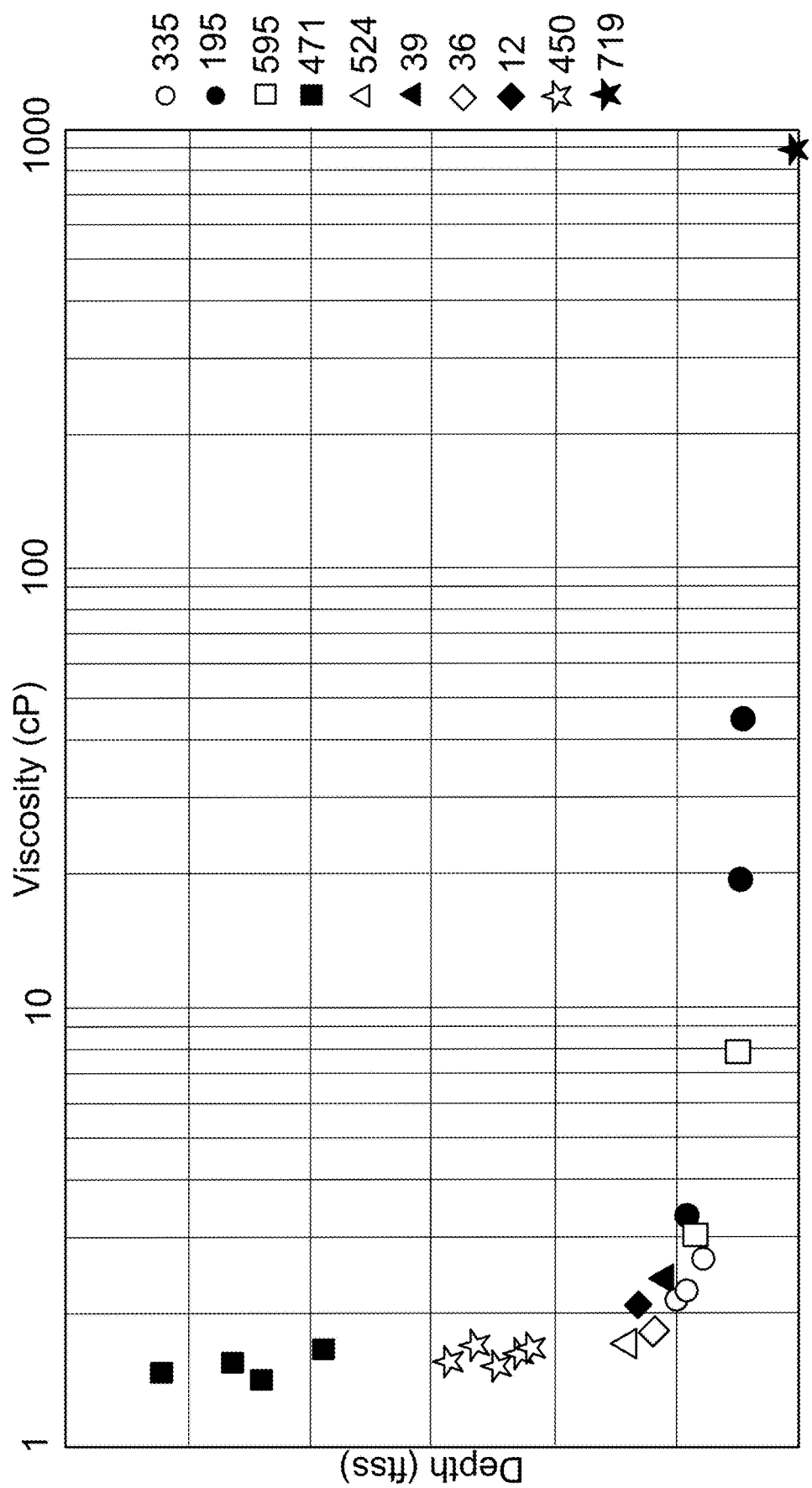
FIG. 1 illustrates a plot of fluid sample depths against measured viscosity.

FIG. 1 illustrates a plot of fluid sample depths against measured viscosity. The sample viscosity measurements shown in FIG. 1 exhibit a depth-dependent oil viscosity trend. Such depth-dependent viscosity can complicate oilfield development using peripheral water injection. However, using the disclosed implementations, an efficient landing depth for water injector laterals can be determined, which provide adequate injectivity while avoiding water injection into the lighter oil column. Peripheral injectors are not landed in oil that is too viscous to be injected through. Recovery is made more efficient as well. For example, peripheral injectors are not inserted above movable oil.

To model viscosity regions across an oilfield, a computer system receives NMR logs for hydrocarbon wells in an oilfield. Such a computer system can be constructed using the components described in more detail with reference to FIG. 9. The NMR logs are acquired at the hydrocarbon well level. A NMR log itself does not directly measure viscosity. The NMR log measures a T2 relaxation time. The T2 relaxation time of each NMR log is calibrated to match the measured viscosity of each hydrocarbon well. The resulting correlation is used to predict the viscosity at every other depth along the NMR-wells. An NMR-well refers to a hydrocarbon well from which an NMR log has been obtained. The T2 relaxation time is a function of the oil molecular weight, such as heavy oil, light oil, or medium oil. The T2 relaxation time is interpreted in terms of the volume of heavy oil, medium oil, and light oil. An equation is generated to relate the NMR response (the volume of the heavy oil, the medium oil, and the light oil) to the actual measured viscosity from the samples taken from each hydrocarbon well. The measurement of VT-11 correlates to the viscosity, and validates the generated equation for predicting the viscosity of the hydrocarbons. VT-11 refers to the particular correlation used. The VT-11 correlation is illustrated in more detail with reference to FIG. 4. Therefore, for hydrocarbon wells having an NMR log but no actual viscosity measurements, the equation can be used to predict the viscosity.

Figure 2:
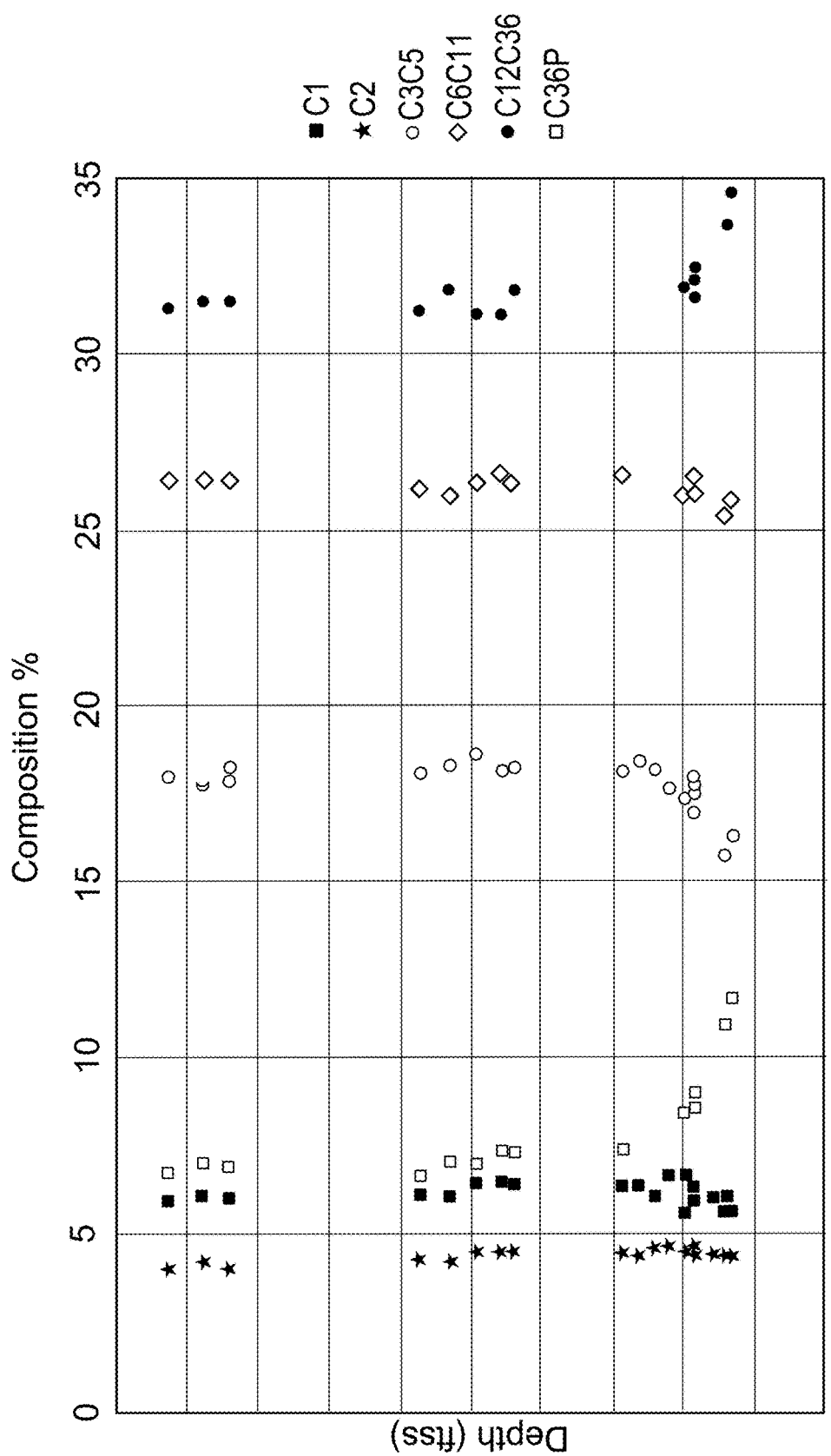
FIG. 2 illustrates compositional analysis of pressure-volume-temperature (PVT) samples against depth.

FIG. 2 illustrates a plot of compositional analysis of pressure-volume-temperature (PVT) samples against depth. Samples of the reservoir fluid are collected at a stage in a hydrocarbon well's producing life. PVT analysis is performed in a laboratory on the samples. The samples represent the reservoir system under particular conditions, such that volumetric and phase behavior, and fluid composition can be analyzed.

Figure 7:
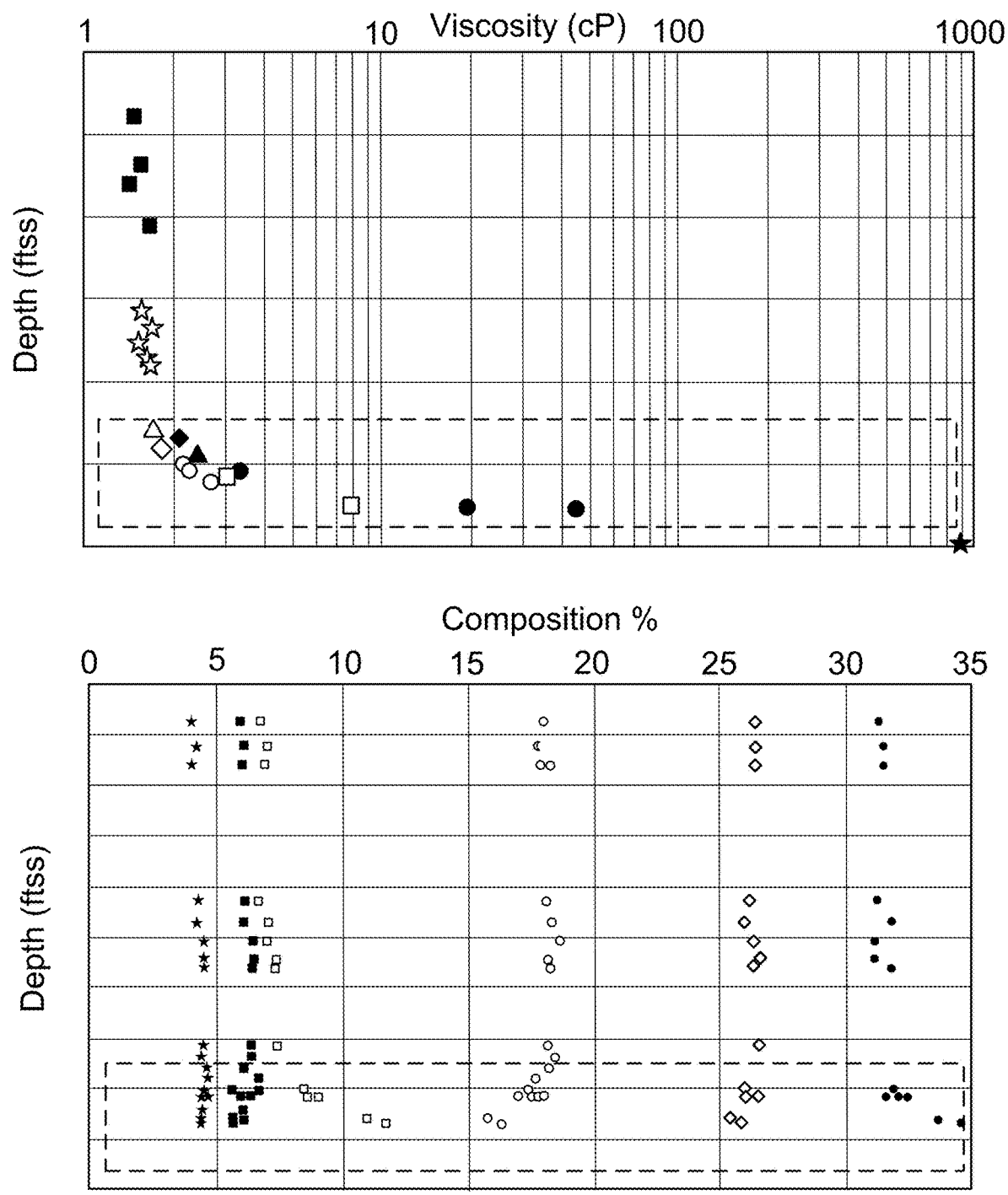
FIG. 7 illustrates a depth at which viscosity begins to significantly increase corresponding to the depth at which the composition begins to significantly change.

The computer system receives the compositional analysis for the PVT samples from the laboratory. The compositional analysis refers to the process of determining the fluid behaviors and properties of oil and gas samples from an oil well. For example, the computer system can examine how the gas evolves from the oil when the pressure decreases below the bubblepoint. In FIG. 7, the variation in the composition correlates with the variation in viscosity. The depth at which the viscosity begins to significantly increase (5850 feet sub-surface) corresponds to the depth at which the composition starts to significantly change. A particular depth at which viscosity begins to significantly increase corresponding to the depth at which the composition begins to significantly change is illustrated and described in more detail with reference to FIG. 7.

The computer system determines an extent to which the compositions of the hydrocarbons vary with depth based on the compositional analysis of the PVT samples. The computer system determines a fluid composition gradient based on an extent to which a composition of the hydrocarbons varies with depth.

Figure 3:
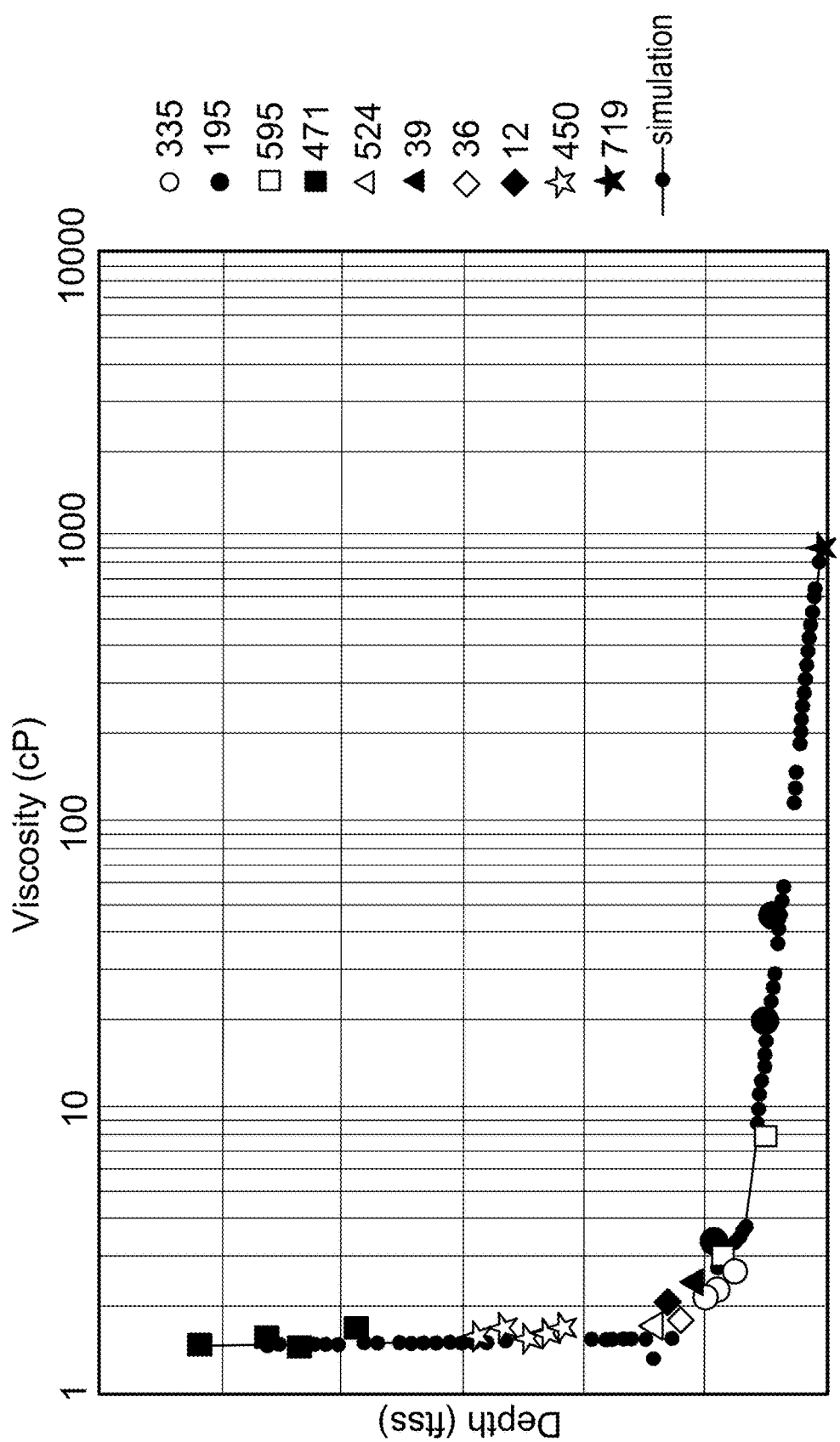
FIG. 3 illustrates modeling of viscosity-depth behavior in a numerical simulator.

FIG. 3 illustrates modeling of viscosity-depth behavior in a numerical simulator. In FIG. 3, the equation of state (EOS) parameters, the NMR-derived viscosity regions, and the composition against depth equations (for each region) are used to construct a three-dimensional (3D) viscosity model that reproduces the measured variation in viscosity with depth. The EOS parameters are illustrated and described in more detail with reference to FIG. 8. The NMR-derived viscosity regions are illustrated and described in more detail with reference to FIGS. 5 and 6. A 3D cross section of viscosity regions is illustrated and described in more detail with reference to FIG. 6.

Figure 4A:
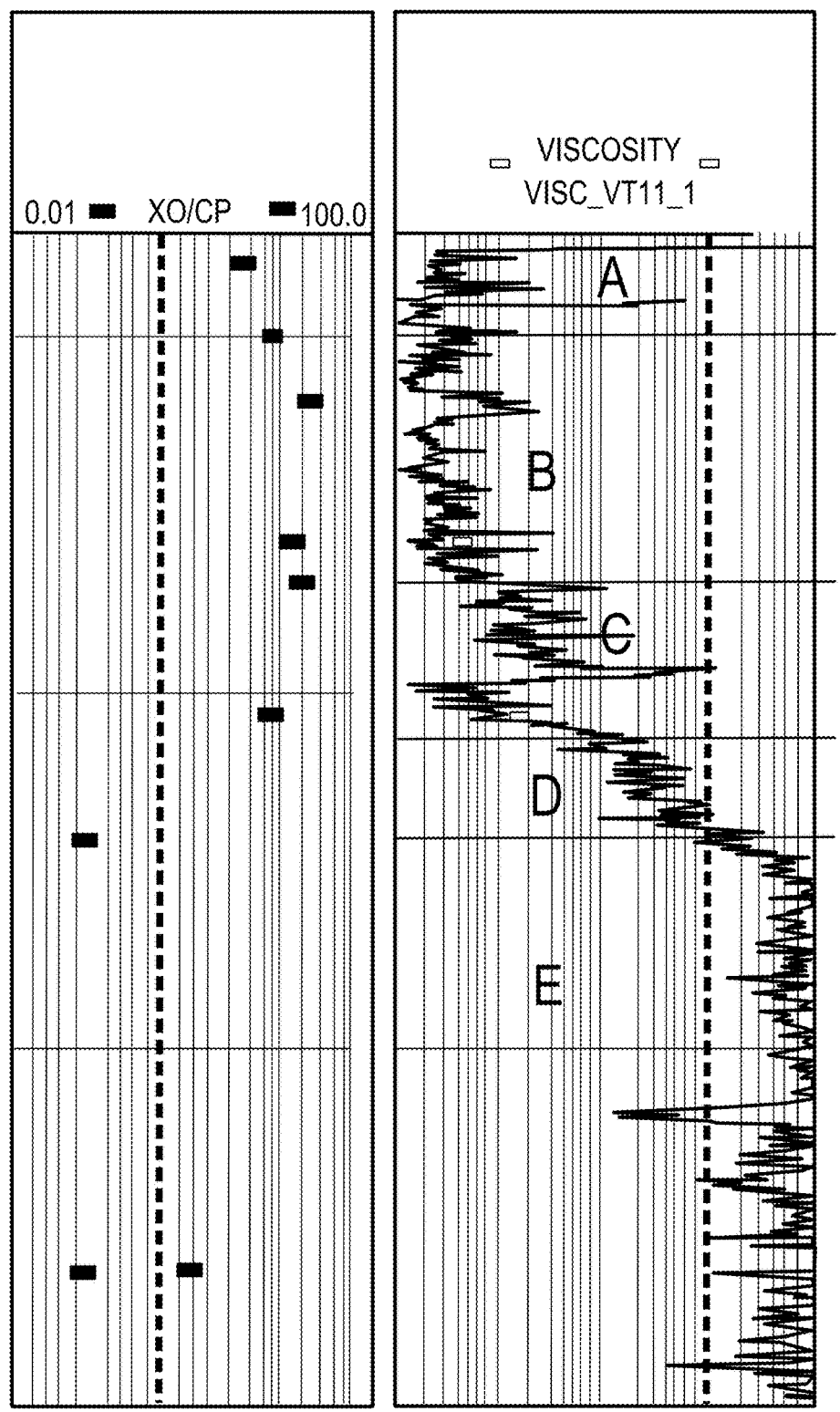
FIGS. 4A and 4B illustrate an example viscosity prediction based on Neutron Magnetic Resonance (NMR) logs showing an evolution from light oil to tar.
Figure 4B:
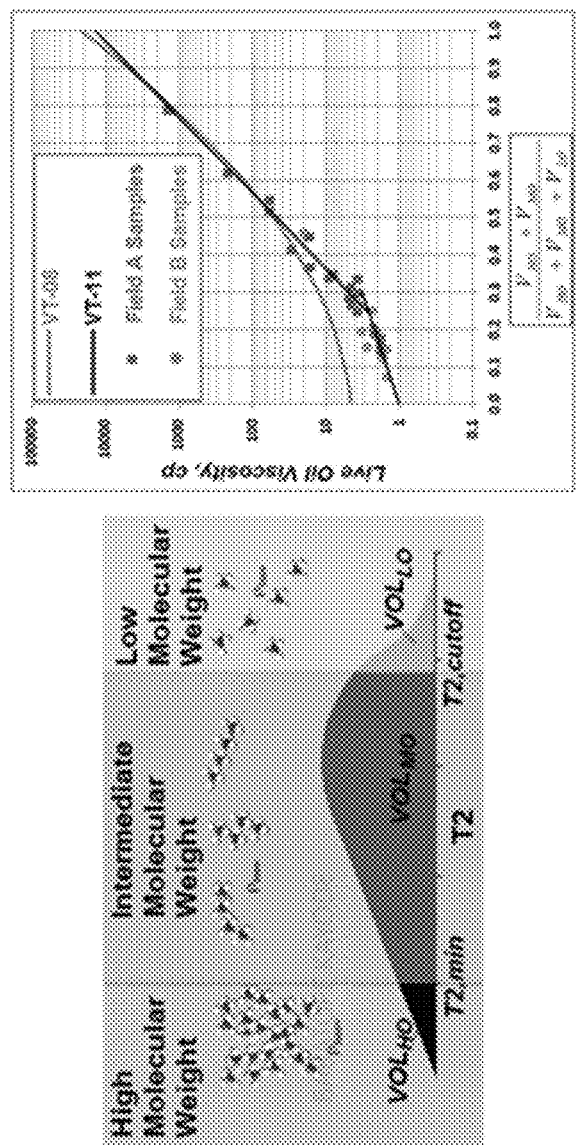
Figure 5:
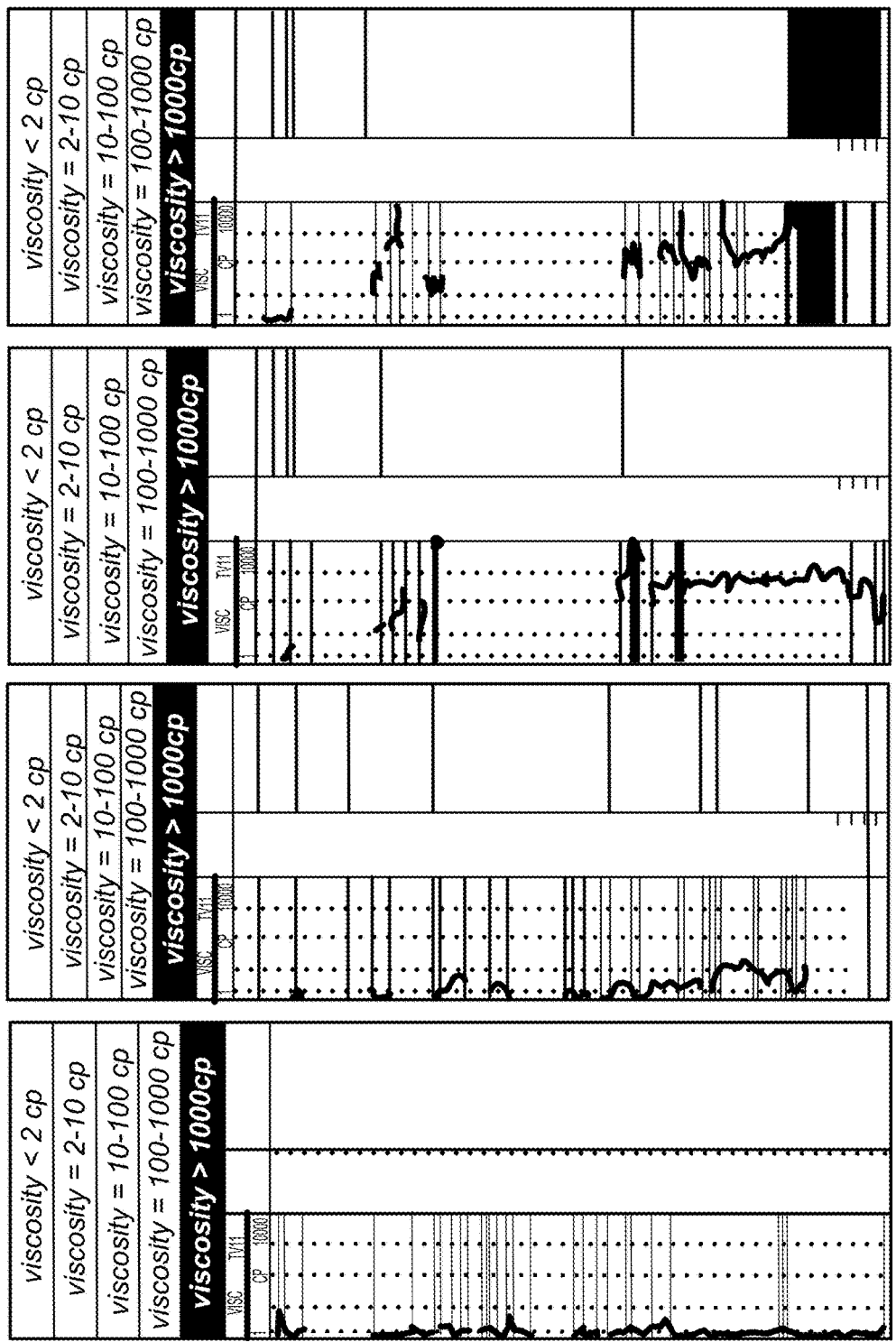
FIG. 5 illustrates example viscosity regions derived from NMR logs.

FIGS. 4A and 4B illustrate an example viscosity prediction based on NMR logs showing an evolution from light oil to tar. FIG. 5 relates to the identification of viscosity picks at the hydrocarbon well level. The computer system identifies multiple viscosity regions of hydrocarbons present within the hydrocarbon wells based on the NMR-predicted viscosity. The NMR logs are acquired on the oil wells, such that a broad coverage is achieved across the reservoir. The computer system identifies viscosity regions by determining a viscosity of the hydrocarbons present at a particular depth from the surface of the Earth within each hydrocarbon well. The viscosity of the hydrocarbons present at a particular depth is determined based on a calibrated T2 relaxation time from the NMR logs.

The NMR logs are acquired on hydrocarbon wells across the oilfield. The NMR logs thus provide coverage across a hydrocarbon reservoir. The T2 relaxation time in the NMR logs is calibrated to match the measured viscosity. The relaxation represents how the imaging signals deteriorate with time, becoming more weak. The deterioration reflects the fact that the NMR signal, which results from nuclear magnetization, arises from the over-population of an excited state. Relaxation is the conversion of this non-equilibrium population to a normal population. The deterioration of an NMR signal can be analyzed in terms of a time constant T2 responsible for the broadening of the signal. T2 relaxation affects the components of the nuclear spin magnetization vector perpendicular to the external magnetic field.

In some embodiments, the T2 relaxation time from the NMR logs is calibrated to match the measured viscosity. The resulting correlation is used to predict the viscosity at every other depth along the NMR-wells. The T2 relaxation time is a function of the oil molecular weight, such as heavy oil, light-oil, or medium oil. The T2 relaxation time is interpreted in terms of volumes of heavy, medium, and light-oil. Equations are generated to relate the NMR response (volumes of heavy, medium, and light-oil) to the actual measured viscosity from fluid samples. For hydrocarbon wells having NMR logs but no viscosity measurements, the equations can be used to predict the viscosity. The NMR-predicted viscosity illustrated in FIG. 4 demonstrates a variation from light oil to tar at the hydrocarbon well level.

FIG. 5 illustrates example viscosity regions derived from NMR logs. The computer system identifies multiple viscosity regions of hydrocarbons present within each hydrocarbon well. The viscosity regions are identified based on the NMR logs. The depth of each viscosity surface is derived for each NMR well. An example is shown in FIG. 5, differentiating four different viscosity regions. The left track in FIG. 5 represents the NMR viscosity profile while the right track represents the viscosity regions identified at each hydrocarbon well.

A total of five different viscosity regions are defined at each NMR well. The viscosity regions include light-oil having a viscosity less than 2 centipoise (cP), medium oil having a viscosity in a range from 2 to 10 cP, heavy oil having a viscosity in a range from 10 to 100 cP, very heavy oil having a viscosity in a range from 100 to 1000 cP, and tar having a viscosity greater than 1000 cP.

Figure 6:
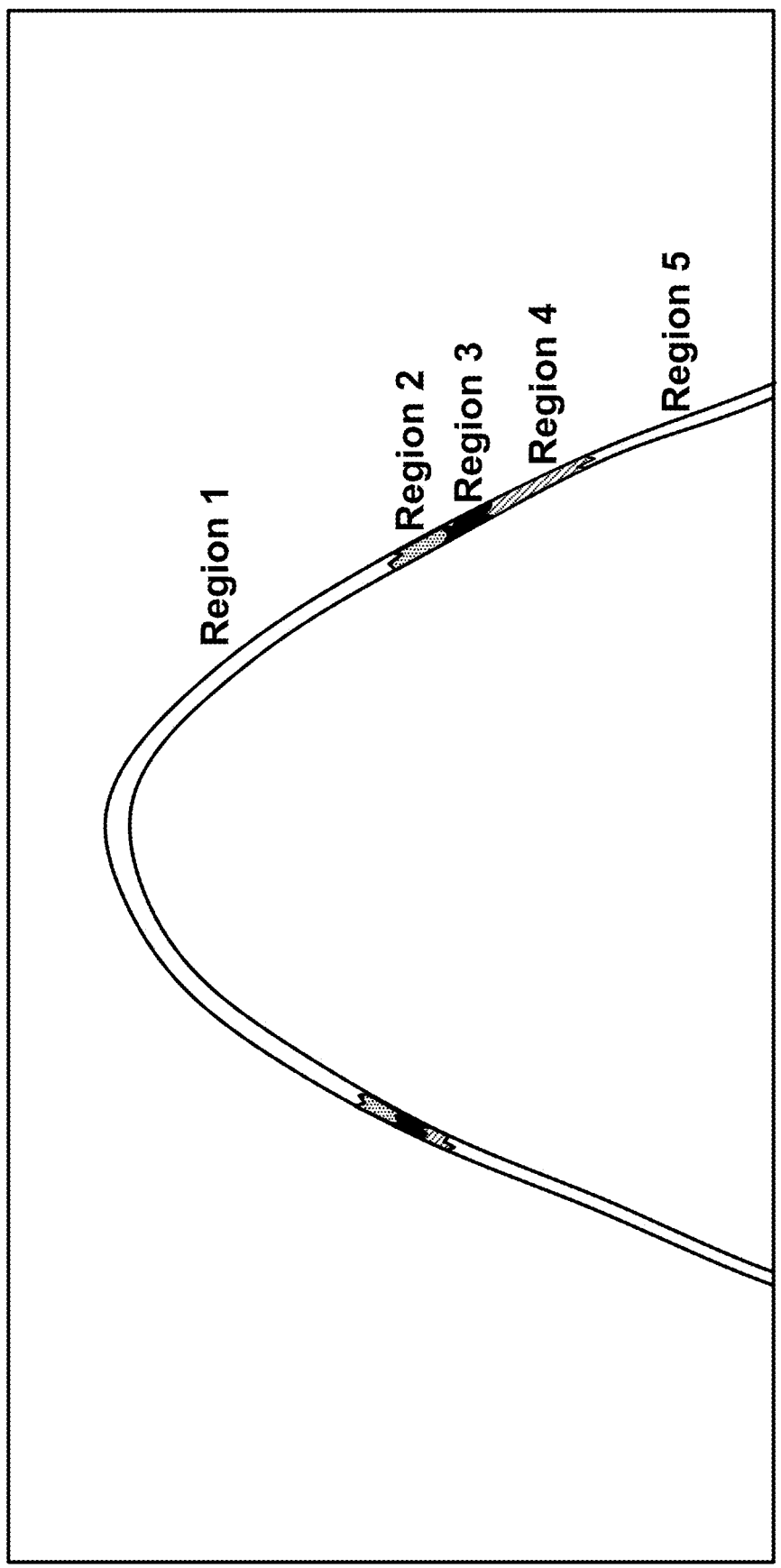
FIG. 6 illustrates a three-dimensional (3D) cross section of viscosity regions.

FIG. 6 illustrates a three-dimensional (3D) cross section of viscosity regions. The depth interval between succeeding viscosity surfaces defines a viscosity region. The computer system identifies the viscosity regions by identifying viscosity surfaces present within the hydrocarbon wells as illustrated. The viscosity surfaces are identified based on the NMR-predicted viscosity. Each viscosity surface is associated with a particular depth from the surface of the Earth. Each viscosity region is bounded by two viscosity surfaces.

The region downhole to Region 4 is tar (Region 5), having a viscosity greater than 1000 cP. The peripheral water injectors are placed in Regions 2, 3, and 4 to determine which region provides better recovery results. In future, hydrocarbon wells need not be geo-steered, since oil well drilling can be planned using the constructed 3D viscosity model. The simulation of the 3D model whose cross-section is illustrated in FIG. 6 assists in predicting efficient landing depths for the lateral water injectors. The model further optimizes oilfield development by providing efficient placement of lateral water injectors to provide adequate injectivity while ensuring that the lateral water injectors are not placed uphole to recoverable hydrocarbons.

The compositional analysis of the PVT samples against depth can be used to derive equations for the different viscosity regions illustrated in FIG. 6. For example, the equation for Region 1 is linear while the equation for Region 2 is logarithmic. The viscosity data for the example Regions 1 and 2 illustrated in FIG. 6 was available. However, composition data for the example Regions 3 and 4 was not available. Therefore, a logarithmic equation representing the composition-depth behavior for Regions 3 and 4 was generated, such that the deepest measured viscosity value (in Region 4) was matched. The viscosity regions identified for each hydrocarbon well are correlated across all the NMR wells (across the oilfield) to define fluid-property zones to be used for numerical simulation.

The fluid region surfaces are determined for each NMR well location and mapped across the oilfield. The development of the viscosity model thus incorporates viscosity profiles observed from formation tester sample measurements. The identification of the viscosity regions per hydrocarbon well is based on the NMR-predicted viscosity. The viscosity regions per hydrocarbon well are correlated across multiple wells to create viscosity regions across the oilfield. Within each viscosity region, a fluid composition gradient equation is derived from observed data. The modelling of compositional variation within different viscosity regions represents the viscosity variation with depth within the reservoir. The viscosity regions are correlated across the NMR wells to define fluid-property zones to be used for numerical simulation.

FIG. 7 illustrates a particular depth at which viscosity begins to significantly increase corresponding to the depth at which the composition begins to significantly change. The two rectangles drawn in dashed lines in FIG. 7 illustrate that the heavier component fractions sharply increase while lighter component fractions sharply reduce at the particular depth.

Figure 8:
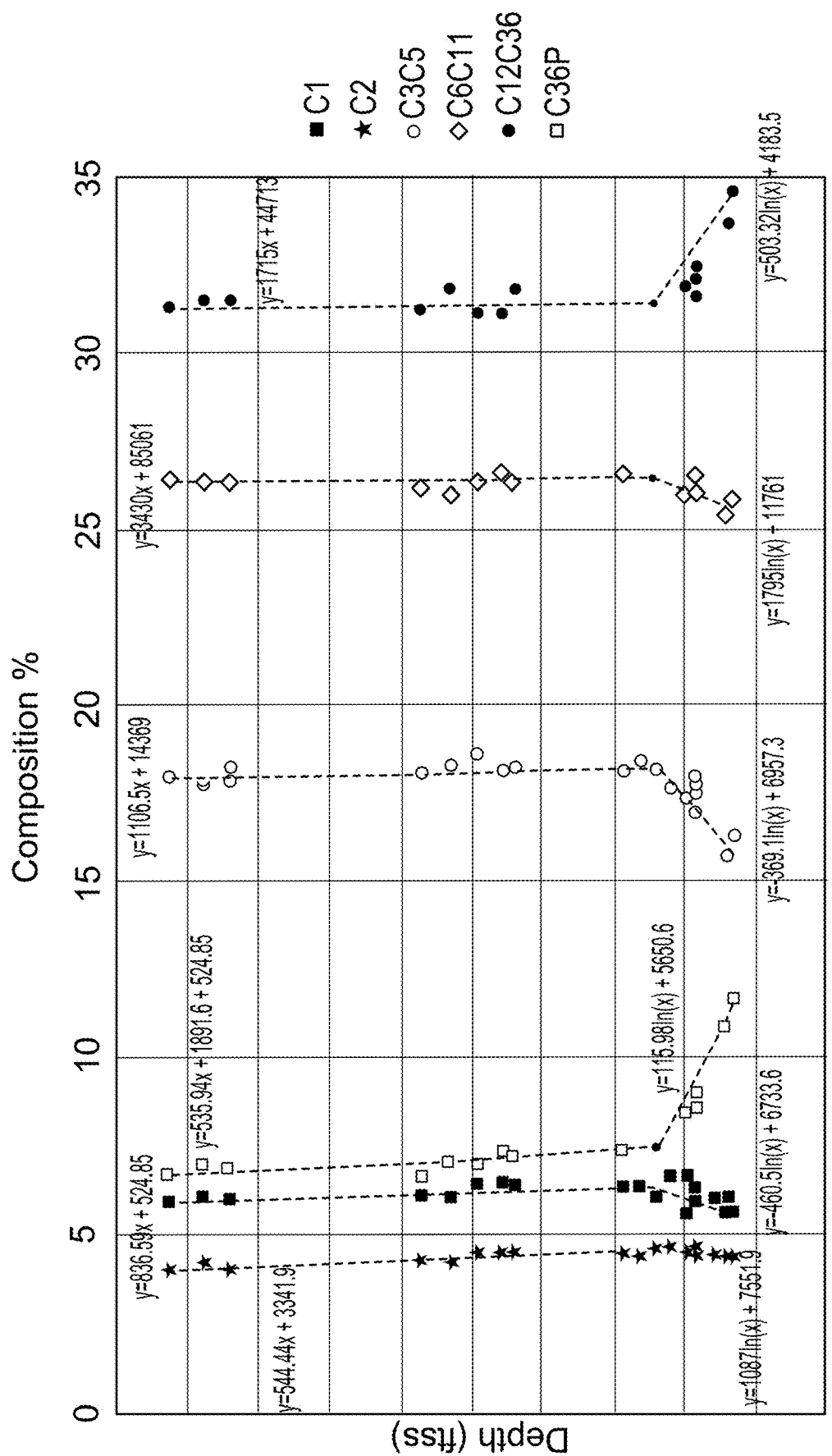
FIG. 8 illustrates equations representing composition against depth behavior for viscosity regions.

FIG. 8 illustrates equations representing the relation of fluid composition against depth for viscosity regions. In FIG. 8, y denotes the depth and x denotes the fluid composition. EOS matching parameters are determined for the pure and lumped components illustrated with reference to FIG. 2. The computer system determines the EOS parameters based on the compositional analysis of the PVT samples obtained from the hydrocarbon wells. The EOS parameters are determined by matching the PVT experiments. The EOS parameters represent the composition against depth behavior within the different fluid regions.

The computer system generates a model of the viscosity regions across the oilfield. The generating of the model is based on the EOS parameters and behavior of compositions of the hydrocarbons with respect to a depth within each viscosity region. For example, the model is based on the fluid composition gradient with respect to the depth within each viscosity region. The depth is measured from a surface of the Earth. The fluid region surfaces, the EOS parameters, and the equations representing the composition against depth behavior were used as input into a numerical simulator. The equations illustrated in FIG. 8 represent the composition against depth behavior for the Viscosity Regions 1 and 2 illustrated in more detail with reference to FIG. 6. For each viscosity region, the computer system determines the extent to which the compositions of the hydrocarbons present within the viscosity region change with the depth.

The computer system numerically simulates the 3D viscosity model based on the viscosity regions, the EOS parameters, and the equations representing the behavior of the compositions of the hydrocarbons. The viscosity profile resulting from the simulation of the 3D viscosity model matches the sample viscosity data illustrated in FIG. 3.

The computer system determines a landing depth from the surface of the Earth for operation of peripheral water injectors for the hydrocarbon wells. The peripheral water injectors are placed at a particular depth to inject water (such as brine) into the oil field to increase pressure and thereby stimulate production. Determination of the landing depth is based on numerical simulation of the 3D model of the viscosity regions. The landing depth is downhole to the recoverable hydrocarbons and uphole to the tar. For example, peripheral water injectors can be operated in Regions 2, 3 and 4 (illustrated in FIG. 6) to determine the best recovery results. Geo-steering is also obviated since the generated 3D geo-model can be used as the basis for planning future wells.

FIG. 9 illustrates a process for numerical simulation of hydrocarbon systems with viscosity gradient. In some embodiments, the process is performed by a computer system.

The computer system receives 904 nuclear magnetic resonance (NMR) logs for hydrocarbon wells in an oilfield. Viscosity surfaces are identified for the hydrocarbons present within the hydrocarbon wells based on the NMR logs. Each viscosity surface is associated with a particular depth from the surface of the Earth. Each viscosity region is bounded by two viscosity surfaces. The development of the viscosity model thus incorporates viscosity profiles observed from formation tester sample measurements. The identification of the viscosity regions per hydrocarbon well is based on the NMR logs. The viscosity regions per hydrocarbon well are correlated across multiple wells to create viscosity regions across the oilfield.

The computer system identifies 908 viscosity regions for the hydrocarbons present within the hydrocarbon wells based on the NMR logs. To identify the viscosity regions, the computer system determines a viscosity of the hydrocarbons present at a particular depth from the surface of the Earth within each hydrocarbon well based on a calibrated T2 relaxation time from the NMR logs. In some embodiments, the T2 relaxation time from the NMR logs is calibrated to match the measured viscosity. The resulting correlation is used to predict the viscosity at every other depth along the NMR-wells. The T2 relaxation time is a function of the oil molecular weight, such as heavy oil, light-oil, or medium oil. The T2 relaxation time is interpreted in terms of volumes of heavy, medium, and light-oil. Equations are generated to relate the NMR response (volumes of heavy, medium, and light-oil) to the actual measured viscosity from fluid samples. For hydrocarbon wells having NMR logs but no viscosity measurements, the equations can be used to predict the viscosity.

The computer system determines 912 EOS parameters based on compositional analysis of PVT samples obtained from the hydrocarbon wells. The EOS parameters are determined by matching the PVT experiments. The EOS parameters represent the composition against depth behavior within the different fluid regions. The computer system also determines an extent to which the compositions of the hydrocarbons vary as a viscosity of the hydrocarbons varies based on the compositional analysis of the PVT samples.

The computer system generates 916 a 3D model of oil viscosity across the oilfield. The generating of the 3D viscosity model is based on the EOS parameters, NMR-predicted viscosity regions, and a composition-depth equation within each viscosity region. For example, the viscosity regions include light oil having viscosity less than 2 centipoise (cP), medium oil having viscosity in a range from 2 to 10 cP, heavy oil having viscosity in a range from 10 to 100 cP, very heavy oil having viscosity in a range from 100 to 1000 cP, and tar having viscosity greater than 1000 cP.

The computer system simulates 920 the model of the viscosity regions to determine a landing depth from the surface of the Earth for operation of peripheral water injectors. The landing depth is downhole to recoverable hydrocarbons and uphole to the tar. The landing depth for the water injector laterals is determined to ensure adequate injectivity (the injectors are not landed in oil that is too viscous to be injected through) and improve hydrocarbon recovery (injectors are not injected above movable oil).

The methods described can be performed in any sequence or in any combination and the components of respective implementations may be combined in any manner. The machine-implemented operations described above can be implemented by programmable circuitry programmed or configured by software or firmware, or entirely by special-purpose (hardwired) circuitry, or by a combination of such forms. Such special-purpose circuitry (if any) can be in the form of, for example, one or more application-specific integrated circuits, programmable logic devices, field-programmable gate arrays, or system-on-a-chip systems.

Software or firmware to implement the techniques introduced here may be stored on a machine-readable storage medium and may be executed by one or more general-purpose or special-purpose programmable microprocessors. A machine-readable medium, as the term is used herein, includes any mechanism that can store information in a form accessible by a machine (a machine may be, for example, a computer, network device, cellular phone, personal digital assistant, manufacturing tool, or any device with one or more processors). For example, a machine-accessible medium includes recordable or non-recordable media (e.g., RAM or ROM, magnetic disk storage media, optical storage media, or flash memory devices).

The term logic, as used herein, means special-purpose hardwired circuitry, such as one or more application-specific integrated circuits, programmable logic devices, field programmable gate arrays, or other similar devices, programmable circuitry programmed with software or firmware, such as one or more programmed general-purpose microprocessors, digital signal processors or microcontrollers, system-on-a-chip systems, or other similar devices, or a combination of the forms.

What is claimed is:

1. A method comprising:
   receiving, by a computer system, a plurality of Neutron Magnetic Resonance (NMR) logs for a plurality of hydrocarbon wells in an oilfield;
   identifying, by the computer system, a plurality of viscosity regions of hydrocarbons present within the plurality of hydrocarbon wells based on the plurality of NMR logs;
   determining, by the computer system, equation of state (EOS) parameters based on compositional analysis of pressure-volume-temperature (PVT) samples obtained from the plurality of hydrocarbon wells;
   generating, by the computer system, a three-dimensional (3D) numerical simulation model comprising the plurality of viscosity regions across the oilfield, the generating of the 3D numerical simulation model's 3D viscosity array is based on the EOS parameters and a fluid composition gradient with respect to a depth within each viscosity region, wherein each viscosity region corresponds to a depth interval between viscosity surfaces within the 3D numerical simulation model, each viscosity surface associated with a particular depth from a surface of the Earth as identified from the plurality of wells having NMR logs; and
   determining, by the computer system, a landing depth from the surface of the Earth for operation of peripheral water injectors based on the 3D numerical simulation model comprising the plurality of viscosity regions of the hydrocarbons present within the plurality of hydrocarbon wells having NMR logs, wherein the viscosity regions are correlated across the oilfield.

2. The method of claim 1, wherein the identifying of the plurality of viscosity regions comprises determining, by the computer system, a viscosity of the hydrocarbons present at the depth within each hydrocarbon well of the plurality of hydrocarbon wells based on a calibrated T2 relaxation time from the plurality of NMR logs.

3. The method of claim 1, wherein the identifying of the plurality of viscosity regions comprises identifying, by the computer system, a plurality of viscosity surfaces of the hydrocarbons present within the plurality of hydrocarbon wells.

4. The method of claim 3, wherein each viscosity region of the plurality of viscosity regions is bounded by two viscosity surfaces of the plurality of viscosity surfaces.

5. The method of claim 1, wherein the plurality of viscosity regions comprises at least:
   light-oil having a viscosity less than 2 centipoise (cP);
   medium oil having a viscosity in a range from 2 to 10 cP;
   heavy oil having a viscosity in a range from 10 to 100 cP;
   very heavy oil having a viscosity in a range from 100 to 1000 cP; and
   tar having a viscosity greater than 1000 cP.

6. The method of claim 1, further comprising determining, by the computer system, the fluid composition gradient based on an extent to which a composition of the hydrocarbons varies with the depth.

7. The method of claim 1, wherein the 3D numerical simulation model comprises the plurality of viscosity regions, the EOS parameters, and the fluid composition gradient.

8. A non-transitory computer-readable storage medium storing instructions executable by one or more computer processors, the instructions when executed by the one or more computer processors cause the one or more computer processors to:
   receive a plurality of Neutron Magnetic Resonance (NMR) logs for a plurality of hydrocarbon wells in an oilfield;
   identify a plurality of viscosity regions of hydrocarbons present within the plurality of hydrocarbon wells based on the plurality of NMR logs;
   determine equation of state (EOS) parameters based on compositional analysis of pressure-volume-temperature (PVT) samples obtained from the plurality of hydrocarbon wells;
   generate a three-dimensional (3D) numerical simulation model of the plurality of viscosity regions across the oilfield, the generating of the 3D numerical simulation model's 3D viscosity array is model based on the EOS parameters and a fluid composition gradient with respect to a depth within each viscosity region, wherein each viscosity region corresponds to a depth interval between viscosity surfaces within the 3D numerical simulation model, each viscosity surface associated with a particular depth from a surface of the Earth as identified from the plurality of wells having NMR logs; and determine a landing depth from the surface of the Earth for operation of peripheral water injectors based on simulating the 3D numerical simulation model comprising the plurality of viscosity regions of the hydrocarbons present within the plurality of hydrocarbon wells having NMR logs, wherein the viscosity regions are correlated across the oilfield.

9. The non-transitory computer-readable storage medium of claim 8, wherein the identifying of the plurality of viscosity regions comprises determining a viscosity of the hydrocarbons present at the depth within each hydrocarbon well of the plurality of hydrocarbon wells based on a calibrated T2 relaxation time from the plurality of NMR logs.

10. The non-transitory computer-readable storage medium of claim 8, wherein the identifying of the plurality of viscosity regions comprises identifying a plurality of viscosity surfaces of the hydrocarbons present within the plurality of hydrocarbon wells.

11. The non-transitory computer-readable storage medium of claim 10, wherein each viscosity region of the plurality of viscosity regions is bounded by two viscosity surfaces of the plurality of viscosity surfaces.

12. The non-transitory computer-readable storage medium of claim 8, wherein the plurality of viscosity regions comprises at least:
light-oil having a viscosity less than 2 centipoise (cP);
medium oil having a viscosity in a range from 2 to 10 cP;
heavy oil having a viscosity in a range from 10 to 100 cP;
very heavy oil having a viscosity in a range from 100 to 1000 cP; and
tar having a viscosity greater than 1000 cP.

13. The non-transitory computer-readable storage medium of claim 8, wherein the instructions further cause the one or more computer processors to determine the fluid composition gradient based on an extent to which a composition of the hydrocarbons varies as a viscosity of the hydrocarbons varies with the depth.

14. The non-transitory computer-readable storage medium of claim 8, wherein the 3D numerical simulation model comprises the plurality of viscosity regions based on a viscosity of the hydrocarbons present at the depth, the EOS parameters, and the fluid composition gradient.

15. A computer system comprising:
one or more computer processors; and
a non-transitory computer-readable storage medium storing instructions executable by the one or more computer processors, the instructions when executed by the one or more computer processors cause the one or more computer processors to:
receive a plurality of Neutron Magnetic Resonance (NMR) logs for a plurality of hydrocarbon wells in an oilfield;
identify a plurality of viscosity regions of hydrocarbons present within the plurality of hydrocarbon wells based on the plurality of NMR logs;
determine equation of state (EOS) parameters based on compositional analysis of pressure-volume-temperature (PVT) samples obtained from the plurality of hydrocarbon wells;
generate a three-dimensional (3D) numerical simulation model comprising the plurality of viscosity regions across the oilfield, the generating of the 3D numerical simulation model's 3D viscosity array is based on the EOS parameters and a fluid composition gradient with respect to a depth within each viscosity region, wherein each viscosity region corresponds to a depth interval between viscosity surfaces within the 3D numerical simulation model, each viscosity surface associated with a particular depth from a surface of the Earth as identified from the plurality of wells having NMR logs; and
determine a landing depth from the surface of the Earth for operation of peripheral water injectors based on the 3D numerical simulation model comprising the plurality of viscosity regions of the hydrocarbons present within the plurality of hydrocarbon wells having NMR logs, wherein the viscosity regions are correlated across the oilfield.

16. The computer system of claim 15, wherein the identifying of the plurality of viscosity regions comprises determining a viscosity of the hydrocarbons present at the depth within each hydrocarbon well of the plurality of hydrocarbon wells based on a calibrated T2 relaxation time from the plurality of NMR logs.

17. The computer system of claim 15, wherein the identifying of the plurality of viscosity regions comprises identifying a plurality of viscosity surfaces of the hydrocarbons present within the plurality of hydrocarbon wells.

18. The computer system of claim 17, wherein each viscosity region of the plurality of viscosity regions is bounded by two viscosity surfaces of the plurality of viscosity surfaces.

19. The computer system of claim 15, wherein the plurality of viscosity regions comprises at least:
light-oil having a viscosity less than 2 centipoise (cP);
medium oil having a viscosity in a range from 2 to 10 cP;
heavy oil having a viscosity in a range from 10 to 100 cP;
very heavy oil having a viscosity in a range from 100 to 1000 cP; and
tar having a viscosity greater than 1000 cP.

20. The computer system of claim 15, wherein the instructions further cause the one or more computer processors to determine the fluid composition gradient based on an extent to which a composition of the hydrocarbons varies as a viscosity of the hydrocarbons varies.

* * * * *